United States Patent
Lambert

[15] 3,679,777
[45] July 25, 1972

[54] PHOTODEGRADABLE POLYOLEFINS
[72] Inventor: Bernard Lambert, Paris, France
[73] Assignee: Ethylene Plastique
[22] Filed: Aug. 31, 1970
[21] Appl. No.: 68,509

[30] Foreign Application Priority Data

Sept. 5, 1969    Great Britain.....................44,093/69

[52] U.S. Cl. ...............................260/897 A, 47/9, 260/87.3, 260/93.7, 260/94.9 GD, 260/DIG. 43
[51] Int. Cl..........................................C08f 45/00, C08f 3/04
[58] Field of Search..............260/45.8 A, 94.9 GD, 94.9 GC, 260/897 A, 93.7, 87.3; 47/9

[56] References Cited

UNITED STATES PATENTS

| | | | |
|---|---|---|---|
| 3,323,930 | 6/1967 | Newland et al. | 260/45.8 A |
| 3,252,250 | 5/1966 | Lemaire | 47/9 |
| 3,590,528 | 7/1971 | Shepherd | 260/93.7 |
| 3,454,510 | 7/1969 | Newland et al. | 260/94.9 |
| 3,320,695 | 5/1967 | Moore | 47/9 |
| 3,341,357 | 9/1967 | Feild | 47/9 |

OTHER PUBLICATIONS

Ikeda et al., Chemical Abstracts, Vol. 51, 2395d, (1957).
Danyushevskii, Chemical Abstracts, Vol. 48, 10354h–10355a, (1954).

*Primary Examiner*—Joseph L. Schofer
*Assistant Examiner*—Edward J. Smith
*Attorney*—John Lezdey

[57] ABSTRACT

The photodegradation of polyolefin compositions is accelerated by the incorporation therein of from 0.1 to 2 percent by weight of a γ-pyrone ring-containing compound, such as chromone, flavone or xanthone. Polyolefin films containing such additives are useful as wrapping films and, particularly, agricultural mulching films.

3 Claims, No Drawings

PHOTODEGRADABLE POLYOLEFINS

The present invention is concerned with polyolefin compositions.

Poly-alpha-olefins and copolymers thereof containing at least 80 percent by weight of units derived from an alpha-olefinic monomer (which copolymers are hereinafter to be understood to be included in the expression "poly-alpha-olefins"), are used as packaging materials and in agriculture on a very large scale. These polymers undergo degradation and become fragile, i.e., they are aged, when exposed for prolonged periods to sunlight or other forms of U.V. radiation. For many applications, radiation absorbing agents are added to the polymers in order to retard such ageing, but for many other applications it is desirable to accelerate ageing. The latter applies, for example, to mulching films used in agriculture and horticulture and to disposable packaging of all types, such as films, bags, bottles, hollow articles of other forms, and cellulose sheet materials, such as paper, cardboard or regenerated cellulose, which are coated or lined with polyolefins. For reasons of hygiene and site cleanliness, it is very desirable that such disposable packaging materials should undergo natural destruction as quickly as possible after use.

We have now found that the photodegradation of poly-alpha-olefins can be greatly accelerated by incorporating into such polymers from 0.1 to 2 percent by weight, based on the polymer, of one or more $\gamma$-pyrone ring-containing compounds.

According to the present invention, therefore, we provide a poly-alpha-olefin composition comprising from 0.1 to 2 percent by weight, based on the polymer, of at least one $\gamma$-pyrone ring-containing compound.

Suitable $\gamma$-pyrone ring-containing compounds include, for example chromone, flavone and xanthone.

These additives must be used in proportions in which they are compatible with the polyolefin used. For example, with high pressure poly-ethylene, less than 2 percent of additive, and preferably 0.1 to 1 percent of additive, should be used. Migration of the additive to the surface of the polymer composition occurs with more than 2 percent of additive and even with substantially more than 1 percent of additive, the occurrence and degree of migration varying according to the particular additive and polyolefin used. It has been found that above this threshold the rate of photodegradation decreases. It is as if the additive, after migrating to the surface, forms a screen to ultra-violet radiation, thus making the degradation effect when proportions below the threshold value are used, even more surprising.

The polyolefins which can be used according to the invention are, in particular, high and low density polyethylene, polypropylene, polybutene, vinyl acetate ethylene copolymers, and mixtures of two or more of these polymers, in particular mixtures of polyethylene and polypropylene, mixtures of polyethylene and polybutene, and other mixtures of olefin polymers.

Intimate mixing of the polyolefin and the additive is effected by melting and mixing the polymer with the additive by any suitable means, for example, in an internal mixer of the Banbury or Werner type operating continuously or batchwise or in a single or double screw extruder. During this operation, various other additives, such as colored pigments, carbon black, anti-oxidants, or anti-misting agents, can also be added.

All the methods and materials used for converting polyolefins, olefin copolymers and polyolefin mixtures into films, hollow articles, laminates, etc., can be applied to the compositions according to this invention. In particular, in the case of films, the optical properties of the product vary according to the type of conversion used (for example, flat poured or dipped film, or tubular film (or sheathing) cooled in air) and the nature of the polymer.

Films manufactured from the polymer compositions according to the invention may be transparent or uniformly translucent. In some applications, for example, agricultural mulching, transparency is generally unimportant. However, it is sometimes necessary for the mulching film to be transparent, more particularly for the cultivation of asparagus, and in this case it is advantageous to incorporate a suitable proportion of anti-misting agent in the polymer composition according to the invention.

In the case of polymer compositions which have been opacified by the addition of a suitable quantity of carbon black, generally less than 3 percent, more particularly in the case of opaque black mulching film, it is well known that the carbon black greatly increases resistance to ageing. The additives used according to this invention are nevertheless effective even in this case and accelerate ageing.

The following examples and comparative tests are given by way of illustration only.

EXAMPLE 1

High pressure polyethylene having a hot melt index of 2 and a density of 0.921 at 20°C, and various proportions of xanthone are mixed for 10 minutes at a temperature of 150°C in a Brabender laboratory internal mixer (capacity 30 g). The proportions of xanthone used were, respectively, 0.2, 0.5, and 1 percent by weight with respect to the polyethylene.

The resulting mixture was moulded by melting and compression into sheets having a thickness of 0.5 mm which were exposed to U.V. radiation in a cabinet provided with two Philips HPK 125 lamps and kept at a temperature of 40°C. The sheets were disposed 40 cm from the lamps.

Ageing was assessed by measuring the mechanical properties, and more particularly elongation at break, on a ASTM testpiece. The results are expressed in terms of the U.V. exposure time in hours required to give a reduction of 20, 25, 50, and 75 percent of the initial value of the elongation at break and are given in the table below: similar values for the same polyethylene without any additive are also given.

| Additive content | Elongation at break as % of the initial value (in hrs.) | | | |
|---|---|---|---|---|
| | 75% | 50% | 25% | 20% |
| None | 90 | 133 | 180 | 192 |
| 0.2% | 9 | 48 | 120 | 120 |
| 0.5% | 2 | 3 | 6 | 12 |
| 1.0% | 12 | 24 | 108 | 120 |

The results given in this table may seem to be inconsistent, but with certain contents of xanthone the phenomenon of exudation of the additive takes place.

The same effect (acceleration of degradation of the polymer) has also been observed using the same additive with other polymers, that is low pressure polyethylene, ethylene/vinyl acetate copolymer, and crystalline polybutene-1.

EXAMPLE 2

High pressure polyethylene having a melt flow index of 2 was mixed with 0.5 percent by weight of flavone using the procedure described in Example 1. The rate of degradative of this composition was, on average, twice as rapid as that of the same polyethylene without the additive.

EXAMPLE 3

0.3 percent by weight of xanthone was incorporated in polyethylene and the composition was extruded to form film having a thickness of about 70 microns. Similar film without the additive was also produced.

Photodegradation studies were carried out (a) in a radiation cabinet as described in Example 1, and (b) in the open (natural ageing) at the level of the soil and in natural light during the fine season. The results are given in the same form as in Example 1.

| Treatment | Additive content | Elongation at break as % of the initial value (hours or days) | | | |
|---|---|---|---|---|---|
| | | 75% | 50% | 25% | 20% |

| | | | | | |
|---|---|---|---|---|---|
| (a) | none | 41 h. | 90 h. | 110 h. | 120 h. |
| (b) | none | 78 d. | 118 d. | 145 d. | >150 d. |
| (a) | 0.3% | 6 h. | 16 h. | 35 h. | 39 h. |
| (b) | 0.3% | 23 d. | 37d. | 55 d. | 60 d. |

These results show that by means of the present invention it is possible to produce polyolefin-based films having a controlled rate of degradation and hence a life adapted to the required use.

I claim:

1. A poly-alpha-olefin composition containing from about 0.1 to about 2 percent by weight based on weight of polymer of at least one γ-pyrone ring containing compound selected from the group consisting of chromone, flavone and xanthone.

2. The composition of claim 1 in the form of a film.

3. The composition of claim 1 in the form of an opaque, black, agricultural mulching film.

* * * * *